United States Patent
Henry et al.

(10) Patent No.: US 11,842,429 B2
(45) Date of Patent: Dec. 12, 2023

(54) SYSTEM AND METHOD FOR MACHINE CODE SUBROUTINE CREATION AND EXECUTION WITH INDETERMINATE ADDRESSES

(71) Applicant: Rockwell Collins, Inc., Cedar Rapids, IA (US)

(72) Inventors: Jeff M. Henry, Cedar Rapids, IA (US); Kyle R. Peters, Ely, IA (US); Reed A. Kovach, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 86 days.

(21) Appl. No.: 17/525,296

(22) Filed: Nov. 12, 2021

(65) Prior Publication Data

US 2023/0154078 A1    May 18, 2023

Related U.S. Application Data

(60) Provisional application No. 63/278,576, filed on Nov. 12, 2021.

(51) Int. Cl.
*G06T 15/00* (2011.01)
*G06T 11/20* (2006.01)
*G06T 1/60* (2006.01)

(52) U.S. Cl.
CPC .............. *G06T 11/206* (2013.01); *G06T 1/60* (2013.01)

(58) Field of Classification Search
CPC ......... G06T 15/005; G06T 1/20; G06T 15/04; G09G 5/363; G06F 9/3851

(Continued)

(56) References Cited

U.S. PATENT DOCUMENTS 3,522,586 A    8/1970 Kiji et al.
3,656,178 A    4/1972 Maine et al.
(Continued)

FOREIGN PATENT DOCUMENTS

CA    3095088 C    2/2021
CN    1045835 C    10/1999
(Continued)

OTHER PUBLICATIONS

Anonymous: "SkyDemon Mobile, GBS handheld navigation devices for aircrfaft", Dec. 4, 2021; Internet URL https://web.archive.org/web/20211204140934/https://www.skydemon.aero/inflight/.
(Continued)

*Primary Examiner* — Gordon G Liu
(74) *Attorney, Agent, or Firm* — Suiter Swantz pc llo

(57) ABSTRACT

A method is disclosed. The method may include receiving chart data; converting the received chart data into one or more sets of hardware directives and one or more subroutines, the one or more sets of one or more hardware directives including at least a first set hardware directives and a second set of hardware directives, the first set of hardware directives including one or more relative offsets needing address modification, the second set of hardware directives not needing address modification; generating a display list including the set of hardware directives and one or more rules, the one or more relative offsets needing address modification arranged at a beginning position in the generated display list; providing the generated display list to an on-board aircraft controller; and updating, via the on-board aircraft controller, the one or more absolute addresses of the relative offsets of the first set of hardware directives during run-time.

15 Claims, 4 Drawing Sheets

(58) Field of Classification Search
USPC .................................................. 345/522
See application file for complete search history.

(56) References Cited

U.S. PATENT DOCUMENTS

| | | | |
|---|---|---|---|
| 4,096,527 A | 6/1978 | Furuta | |
| 4,736,303 A | 4/1988 | Itoh et al. | |
| 4,792,981 A | 12/1988 | Cahill, III et al. | |
| 4,876,651 A | 10/1989 | Dawson et al. | |
| 5,050,230 A | 9/1991 | Jones et al. | |
| 5,428,692 A | 6/1995 | Kuehl | |
| 5,454,076 A | 9/1995 | Cain et al. | |
| 5,499,382 A | 3/1996 | Nusinov et al. | |
| 5,537,669 A | 7/1996 | Evans et al. | |
| 5,546,572 A | 8/1996 | Seto et al. | |
| 5,559,707 A | 9/1996 | DeLorme et al. | |
| 5,577,170 A | 11/1996 | Karow | |
| 5,936,637 A | 8/1999 | Seto | |
| 5,978,715 A | 11/1999 | Briffe et al. | |
| 6,014,133 A | 1/2000 | Yamakado et al. | |
| 6,240,341 B1 | 5/2001 | Snyder | |
| 6,275,610 B1 | 8/2001 | Hall, Jr. et al. | |
| 6,320,984 B1 | 11/2001 | Shigeta | |
| 6,448,922 B1 | 9/2002 | Kelly | |
| 6,501,441 B1 | 12/2002 | Ludtke et al. | |
| 6,839,714 B2 | 1/2005 | Wheeler et al. | |
| 7,039,505 B1 | 5/2006 | Southard et al. | |
| 7,096,211 B2 | 8/2006 | Fujihara | |
| 7,173,738 B2 | 2/2007 | Kohn | |
| 7,552,010 B2 | 6/2009 | Saito | |
| 7,552,011 B2 | 6/2009 | Ishii et al. | |
| 7,562,289 B2 | 7/2009 | Bufkin et al. | |
| 7,581,036 B2 | 8/2009 | Powell et al. | |
| 7,609,263 B2 | 10/2009 | Nagasaki et al. | |
| 7,739,622 B2 | 6/2010 | DeLine et al. | |
| 7,777,749 B2 | 8/2010 | Chung et al. | |
| 7,948,502 B2 | 5/2011 | Stanton | |
| 7,966,609 B2 | 6/2011 | Serebryany | |
| 8,035,642 B2 | 10/2011 | Suzuki | |
| 8,165,732 B2 | 4/2012 | Corbefin et al. | |
| 8,169,505 B2 | 5/2012 | Hoshi | |
| 8,306,745 B1 | 11/2012 | Clark et al. | |
| 8,339,417 B2 | 12/2012 | Stroila et al. | |
| 8,374,390 B2 | 2/2013 | Stroila et al. | |
| 8,379,065 B2 | 2/2013 | Nam et al. | |
| 8,515,658 B1 | 8/2013 | Foster et al. | |
| 8,583,368 B1 | 11/2013 | Sindlinger et al. | |
| 8,704,732 B2 | 4/2014 | Pourbigharaz et al. | |
| 8,937,737 B2 | 1/2015 | Tsutsumi et al. | |
| 9,035,969 B2 | 5/2015 | Ivashin et al. | |
| 9,195,637 B2 | 11/2015 | Peraza et al. | |
| 9,430,195 B1 | 8/2016 | Pecoraro et al. | |
| 9,443,433 B1 | 9/2016 | Conway et al. | |
| 9,465,513 B2 | 10/2016 | Sims | |
| 9,489,121 B2 | 11/2016 | Davis et al. | |
| 9,547,727 B2 | 1/2017 | Passani et al. | |
| 9,619,919 B1* | 4/2017 | Postnikov | H04N 13/398 |
| 9,639,309 B1 | 5/2017 | Pugh | |
| 9,671,935 B2 | 6/2017 | Miichi et al. | |
| 9,703,455 B2 | 7/2017 | Cocco et al. | |
| 9,781,294 B1 | 10/2017 | Chapman | |
| 9,818,051 B2 | 11/2017 | Panek et al. | |
| 9,858,823 B1 | 1/2018 | Lynn et al. | |
| 9,891,875 B2 | 2/2018 | Kim et al. | |
| 9,921,721 B2 | 3/2018 | Beavers et al. | |
| 9,939,271 B1 | 4/2018 | Foster et al. | |
| 10,001,376 B1 | 6/2018 | Tiana et al. | |
| 10,061,480 B1 | 8/2018 | McCusker et al. | |
| 10,170,010 B1 | 1/2019 | McCusker et al. | |
| 10,372,079 B2 | 8/2019 | Vogel et al. | |
| 10,674,075 B2 | 6/2020 | Kimura | |
| 10,684,769 B2 | 6/2020 | Yamat et al. | |
| 10,872,274 B2 | 12/2020 | Mao et al. | |
| 10,880,522 B2 | 12/2020 | McCutchen et al. | |
| 10,984,501 B2 | 4/2021 | Milan et al. | |
| 11,030,477 B2 | 6/2021 | Becker et al. | |
| 11,061,563 B1 | 7/2021 | Nielsen et al. | |
| 11,106,329 B2 | 8/2021 | He et al. | |
| 2003/0151630 A1 | 8/2003 | Kellman et al. | |
| 2004/0071351 A1 | 4/2004 | Rade | |
| 2004/0225440 A1 | 11/2004 | Khatwa et al. | |
| 2005/0030321 A1 | 2/2005 | Anwar | |
| 2005/0091340 A1* | 4/2005 | Facemire | G06F 16/9574 |
| | | | 709/218 |
| 2006/0031006 A1 | 2/2006 | Stenbock et al. | |
| 2006/0215915 A1 | 9/2006 | Kim | |
| 2007/0067095 A1 | 3/2007 | King | |
| 2007/0094591 A1 | 4/2007 | Etgen et al. | |
| 2007/0112517 A1 | 5/2007 | Goldstein | |
| 2007/0185651 A1 | 8/2007 | Motoyama et al. | |
| 2008/0046254 A1 | 2/2008 | Nuno et al. | |
| 2008/0103641 A1 | 5/2008 | Ratcliffe | |
| 2008/0240152 A1 | 10/2008 | Quinn et al. | |
| 2009/0080801 A1 | 3/2009 | Hatfield et al. | |
| 2009/0123070 A1 | 5/2009 | Xiaoying | |
| 2009/0125837 A1 | 5/2009 | Hatem et al. | |
| 2009/0324065 A1 | 12/2009 | Ishida et al. | |
| 2010/0128020 A1 | 5/2010 | Oh et al. | |
| 2010/0218089 A1 | 8/2010 | Chao et al. | |
| 2010/0262318 A1 | 10/2010 | Ariens | |
| 2010/0328353 A1 | 12/2010 | McDonald et al. | |
| 2011/0191014 A1 | 8/2011 | Feng et al. | |
| 2012/0019673 A1 | 1/2012 | Narayanan | |
| 2012/0242687 A1 | 9/2012 | Choi | |
| 2012/0287151 A1 | 11/2012 | James et al. | |
| 2014/0168277 A1 | 6/2014 | Ashley et al. | |
| 2014/0225928 A1 | 8/2014 | Konnola et al. | |
| 2014/0282038 A1 | 9/2014 | Royster et al. | |
| 2015/0070373 A1 | 3/2015 | Clinton | |
| 2015/0239574 A1 | 8/2015 | Ball et al. | |
| 2015/0278626 A1 | 10/2015 | Nakamura | |
| 2015/0324088 A1 | 11/2015 | Pasetto et al. | |
| 2016/0092557 A1 | 3/2016 | Stojanovic et al. | |
| 2017/0262413 A1 | 9/2017 | Song et al. | |
| 2017/0299633 A1* | 10/2017 | Pietrowicz | H04L 63/0254 |
| 2017/0313332 A1* | 11/2017 | Paget | B61L 25/025 |
| 2018/0181646 A1 | 6/2018 | Balasa et al. | |
| 2018/0253889 A1 | 9/2018 | Nagasaka | |
| 2019/0057671 A1 | 2/2019 | Baer et al. | |
| 2019/0220234 A1 | 7/2019 | Lewis et al. | |
| 2019/0237043 A1 | 8/2019 | Tahmasebi | |
| 2019/0299701 A1 | 10/2019 | Bartels | |
| 2020/0089694 A1 | 3/2020 | Cabra et al. | |
| 2020/0195924 A1 | 6/2020 | Hsiang | |
| 2020/0251029 A1 | 8/2020 | Tseng | |
| 2020/0255350 A1 | 8/2020 | Baek | |
| 2020/0320142 A1 | 10/2020 | Malak et al. | |
| 2020/0386567 A1 | 12/2020 | Igarashi | |
| 2021/0004930 A1 | 1/2021 | Kamath et al. | |
| 2021/0035453 A1 | 2/2021 | Khan et al. | |
| 2021/0056300 A1 | 2/2021 | Chitta et al. | |
| 2021/0192202 A1 | 6/2021 | Tripuraneni et al. | |
| 2021/0225181 A1 | 7/2021 | Feyereisen et al. | |
| 2021/0349615 A1 | 11/2021 | Ruby et al. | |
| 2023/0154338 A1 | 5/2023 | Henry et al. | |

FOREIGN PATENT DOCUMENTS

| | | |
|---|---|---|
| CN | 100440222 C | 12/2008 |
| CN | 101751449 A | 6/2010 |
| CN | 101676988 B | 12/2011 |
| CN | 102714759 B | 10/2016 |
| CN | 107026958 A | 8/2017 |
| CN | 107402734 A | 11/2017 |
| CN | 109325083 A | 2/2019 |
| CN | 110727747 A | 1/2020 |
| CN | 110906938 A | 3/2020 |
| EP | 0341645 A2 | 11/1989 |
| EP | 0380294 A1 | 8/1990 |
| EP | 0748562 A1 | 10/1998 |
| EP | 1352315 A2 | 10/2003 |
| EP | 1366462 A2 | 12/2003 |
| EP | 1454213 A2 | 9/2004 |
| EP | 1272977 B1 | 12/2004 |

(56) References Cited

FOREIGN PATENT DOCUMENTS

| | | | |
|---|---|---|---|
| EP | 1687777 | A2 | 8/2006 |
| EP | 2224359 | A2 | 9/2010 |
| EP | 2792998 | A2 | 10/2014 |
| EP | 2879061 | A2 | 6/2015 |
| EP | 1736894 | A4 | 7/2016 |
| EP | 3201879 | A1 | 8/2017 |
| EP | 3538978 | A4 | 8/2020 |
| EP | 3845862 | A1 | 7/2021 |
| GB | 2504085 | A | 1/2014 |
| JP | S622721 | A | 1/1987 |
| JP | S62196772 | A | 8/1987 |
| JP | S6393273 | A | 4/1988 |
| JP | H05205069 | A | 8/1993 |
| JP | 3871040 | B2 | 1/2007 |
| JP | 2007133231 | A | 5/2007 |
| JP | 2008022215 | A | 1/2008 |
| JP | 2009282855 | A | 12/2009 |
| JP | 4728744 | B2 | 7/2011 |
| WO | 9523364 | A2 | 8/1995 |
| WO | 1998043208 | A3 | 1/1999 |
| WO | 2011036499 | A1 | 3/2011 |
| WO | 2014146561 | A1 | 9/2014 |
| WO | 2021035223 | A1 | 2/2021 |
| WO | 2021035954 | A1 | 3/2021 |

OTHER PUBLICATIONS

C. Pschierer et al., "Human factors analysis for a 2D enroute moving map application", SPIE, PO Box 10, Bellingham, WA 98227-0010 USA, vol. 5802, May 25, 2005.

Extended European Search Report dated Apr. 11, 2023; European Application No. 22207123.5.

Extended European Search Report dated Apr. 12, 2023; European Application No. 22207050.0.

Extended European Search Report dated Apr. 12, 2023; European Application No. 22207124.3.

Extended European Search Report dated Apr. 18, 2023; European Application No. 22207164.9.

Rockwell Collins: "Flight Database Services for Pro Line Fusion", Jan. 12, 2021, XP093035870, Internet URL: https://www.rockwellcollins.com/-/media/files/unsecure/products/product-brochures/navigation-and-guidance/flight-management-systems/resources/fusion-data-base-services-01.pdf?a=en&lastupdate=20210125195039&csrt=15271691716207860418, p. 5.

Skysectionals: "Tour Low-Altitude Enroute Charts", Sep. 22, 2021; XP093035866, Internet: URL:https://web.archive.org/web/20210922184910/https://skysectionals.com/tour-enroute/.

Stephen Dubet; Institute of Electrical and Electronics Engineers: "Aeronautical charts for electronic flight bags", 22nd. DASC. The 22nd Digital Avionics Systems Conference Proceedings. Indianapolis, IN Oct. 12-16, 2003. vol. 2, pp. 13_D_1_1_13_D_1_9, XP010669024.

ArcGIS, "Introduction to export a map or layout", retrieved from the Internet Nov. 11, 2021.

Bongwon Suh, Haibin Ling, Benjamin B. Bederson, and David W. Jacobs. 2003. Automatic thumbnail cropping and its effectiveness. In Proceedings of the 16th annual ACM symposium on User interface software and technology (UIST 03). Association for Computing Machinery, New York, NY, USA, 95-104.

Houston, Ben & Nielsen, Michael & Batty, Christopher & Nilsson, Ola & Museth, Ken. (2006). Hierarchical RLE Level Set: A compact and versatile deformable surface representation. ACM Trans. Graph.. 25. 151-175.

Jeppesen, "JeppView for Windows, User Guide", (2016), 92 pages.

Lufthanasa Systems Blog, "Lido eRouteManual 4.3 Design Overview", (2016) Retrieved from the Internet.

Maptiler, "Software performs Geocoding, Place name search, and Reverse Geocoding." Retrieved from Internet on Nov. 11, 2021.

Microsoft, "Generate a thumbnail sprite with Azure Media Services", (2021), Retrieved from Internet Nov. 11, 2021.

Narkive Mailinglist Archive, "Fastest Method of Drawing a TileMap", (2002), Retrieved from Internet Nov. 11, 2021.

Navigraph, "Navigraph Charts", Retrieved from the Internet.

Pamental, Jason, "Digging in to dynamic typography", Retrieved from Internet, Nov. 11, 2021, 11 pages.

Pamental, Jason, "The evolution of typography with variable fonts", Retrieved from the Internet, Nov. 11, 2021.

Penquerch, "[AD] RLE clipping speedup patch" (2002), Retrieved from Internet, Nov. 11, 2021.

QGIS: Open-source cross-platform GIS software, Retrieved from Internet, Nov. 11, 2021.

Somasundaram, K. "A Method for Filling Holes in Objects of Medical Images Using Region Labeling and Run Length Encoding Schemes." (2010).

Extended European Search Report dated Mar. 24, 2023; European Application No. 22207029.4.

Anonymous: "algorithm-Contour of a run-length-coded digital shape", Stack Overflow, Dec. 31, 2015, pp. 1-5, URL:https://stackoverflow.com/questions/32354807/contour-of-a-run-length-coded-digital-shape.

Anonymous: "Pilot's Guide to Foreflight Mobile 82nd Edition Covers ForeFlight Mobile v12.7", Aug. 26, 2020, pp. 161-165.

Anonymous: Pilot's Guide to Foreflight Mobile 82nd Edition Covers ForeFlight Mobile v12.7, Aug. 26, 2020, pp. 78-90.

Extended European Search Report dated Apr. 5, 2023, European Application No. 22207025.2.

Extended European Search Report dated Apr. 5, 2023, European Application No. 22207047.6.

Extended European Search Report dated Apr. 5, 2023, European Application No. 22207057.5.

Extended European Search Report dated Apr. 11, 2023, European Application No. 22207049.2.

Extended European Search Report dated Apr. 4, 2023, European Application No. 22207012.0.

Extended European Search Report dated Apr. 5, 2023, European Application No. 22207019.5.

Hatlapatka Radim: "JBIG2 Supported by OCR", EUDML Jul. 9, 2012, pp. 1-9.

Shang Junqing et al.: "JBIG2 text image compression based on OCR", Proceedings of the SPIE, vol. 6067, Jan. 15, 2006, p. 6067D.

Seo et al., "Fast Contour-Tracing Algorithm Based on a Pixel-Following Method for Image Sensors", Sensors, MPDI (Year: 2016).

Extended European Search Report dated Apr. 21, 2023; European Application No. 22207060.9.

Extended European Search Report dated Jun. 13, 2023; European Application No. 22206954.4.

Neupane Prasanga et al.: "Extracting Unknown Repeated Pattern in Tiled Images: 19th International Conference on Hybrid Intelligent Systems (HIS 2019) held in Bhopal, India, Dec. 10-12, 2019" In: Intelligent Autonomous Systems 13, International Publishing, Cham, vol. 1179, pp. 92-102.

Yang Y. et al: "Vectorization of Linear Features in Scanned Topographic Maps Using Adaptive Image Segmentation and Sequential Line Tracking", The International Archives of the Photogrammetry, Remote Sensing and Spatial Information Sciences, vol. XXXIX-B4, Aug. 25, 2012, pp. 103-108.

* cited by examiner

SYSTEM AND METHOD FOR MACHINE CODE SUBROUTINE CREATION AND EXECUTION WITH INDETERMINATE ADDRESSES

CROSS-REFERENCE TO RELATED APPLICATIONS

The present disclosure claims the benefit under 35 U.S.C. § 119(e) of U.S. Provisional Application Ser. No. 63/278,576, filed Nov. 12, 2021, entitled SYSTEMS AND METHODS FOR GENERATION, SELECTION, AND DISPLAY OF MAP-BASED CHART DATABASES FOR USE WITH CERTIFIED AVIONICS SYSTEMS, naming Jeff M. Henry, Kyle R. Peters, Todd E. Miller, Jason L. Wong, Reed A. Kovach, and Srinath Nandakumar as inventor, which is incorporated herein by reference in the entirety.

BACKGROUND

Avionics display systems often do not have ample data storage space available to store avionics chart data. Further, the time required to display chart images during run-time is often extensive.

SUMMARY

A system is disclosed, in accordance with one or more embodiments of the present disclosure. The system includes one or more offboard aircraft controllers including one or more processors configured to execute a set of program instructions stored in a memory. The set of program instructions configured to cause the one or more processors to receive chart data from one or more chart providers. The set of program instructions configured to cause the one or more processors to convert the received chart data into one or more sets of one or more hardware directives and one or more subroutines, the one or more sets of one or more hardware directives including at least a first set of one or more hardware directives and a second set of one or more hardware directives, the first set of one or more hardware directives including one or more relative offsets needing address modification, the second set of one or more hardware directives not needing address modification. The set of program instructions configured to cause the one or more processors to generate a display list including the set of one or more hardware directives and one or more rules, the one or more relative offsets needing address modification arranged at a beginning position of the generated display list. The set of program instructions configured to cause the one or more processors to provide the generated display list to one or more on-board aircraft controllers configured to update one or more absolute addresses of the one or more relative offsets of the first set of one or more hardware directives during run-time.

In some embodiments, the system may further include the one or more on-board aircraft controllers, the one or more on-board aircraft controllers including one or more processors configured to execute a set of program instructions stored in a memory, the set of program instructions configured to cause the one or more processors to: update the one or more absolute addresses of the one or more relative offsets of the first set of one or more hardware directives during run-time; perform at least one hardware directive of the set of one or more hardware directives; execute the one or more subroutines; and execute the one or more rules.

In some embodiments, the one or more subroutines may include at least one subroutine configured to draw a symbol.

In some embodiments, the one or more subroutines may include at least one subroutine configured to draw one or more alphanumeric characters.

In some embodiments, the second set of one or more hardware directives may include a chart image to be rendered based on the received chart data from the one or more chart providers.

In some embodiments, the second set of one or more hardware directives may include one or more calls to the one or more subroutines.

In some embodiments, the one or more rules may include at least one no operation command rule.

In some embodiments, the one or more rules may include at least one set base point opcode rule configured to cause the one or more on-board aircraft controllers to set a base address for the one or more relative offsets during run-time.

In some embodiments, the one or more rules may include at least one branching rule configured to cause the one or more on-board aircraft controllers to execute the display list in a predetermined order.

A method is disclosed, in accordance with one or more embodiments of the present disclosure. The method includes receiving chart data from one or more chart providers. The method includes converting the received chart data into one or more sets of one or more hardware directives and one or more subroutines, the one or more sets of one or more hardware directives including at least a first set of one or more hardware directives and a second set of one or more hardware directives, the first set of one or more hardware directives including one or more relative offsets needing address modification, the second set of one or more hardware directives not needing address modification. The method includes generating a display list including the set of one or more hardware directives and one or more rules, the one or more relative offsets needing address modification arranged at a beginning position in the generated display list. The method includes providing the generated display list to one or more on-board aircraft controllers. The method includes updating, via the one or more on-board aircraft controllers, the one or more absolute addresses of the one or more relative offsets of the first set of one or more hardware directives during run-time.

In some embodiments, the second set of one or more hardware directives may include a chart image to be rendered based on the received chart data from the one or more chart providers.

In some embodiments, the second set of one or more hardware directives may include one or more calls to the one or more subroutines.

In some embodiments, the one or more rules may include at least one no operation command rule.

In some embodiments, the one or more rules may include at least one set base point opcode rule configured to cause the one or more on-board aircraft controllers to set a base address for the one or more relative offsets during run-time.

In some embodiments, the one or more rules may include at least one branching rule configured to cause the one or more on-board aircraft controllers to execute the display list in a predetermined order.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
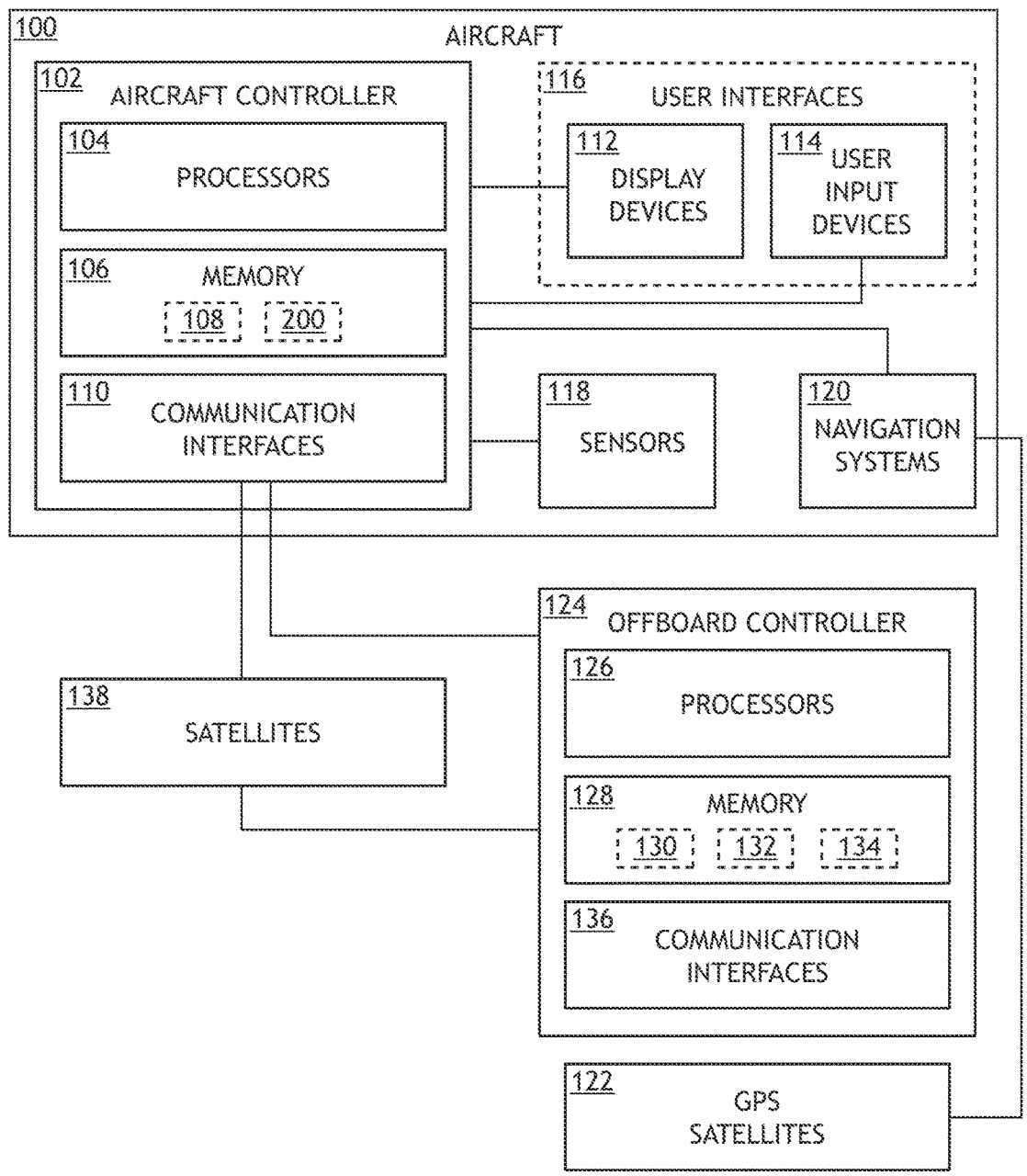
FIG. 1A illustrates a simplified block diagram of an aircraft including the system for machine code subroutine creation and execution with indeterminate addresses, in accordance with one or more embodiments of the present disclosure.

Reference will now be made in detail to the subject matter disclosed, which is illustrated in the accompanying drawings.

Before explaining one or more embodiments of the present disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the present disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-3 generally illustrate a system and method for machine code subroutine creation and execution with indeterminate addresses, in accordance with one or more embodiments of the present disclosure.

Avionics display systems often do not have ample data storage space available to store avionics chart data for each aeronautical chart. For example, avionics display systems may only have 4 Gb of available data storage space for chart data, however, the uncompressed chart data may approach approximately 40 Gb. Further, the time required to display chart images during run-time is often extensive. For example, hardware directives often rely on knowledge of a base address, which is not known when the tools run and may be different based on the hardware of the display system. However, parsing the entire set of display directives in order to replace all the directives that require a base address is time consuming and not feasible in most applications.

As such, it would be desirable to provide a system and method for machine code subroutine creation and execution with indeterminate addresses. The system and method should minimize the amount of time required to access chart data during run-time and lower the space required to store the display images. The system and method should allow the implementation of hardware level drawing directives without knowledge of the hardware base address. For example, the system and method may be configured to convert hardware display directives off-line and create sorted keys (e.g., subroutines) to speed up data access during run-time. The system and method should minimize the time required to update the hardware directives with the current base address.

Figure 1B:
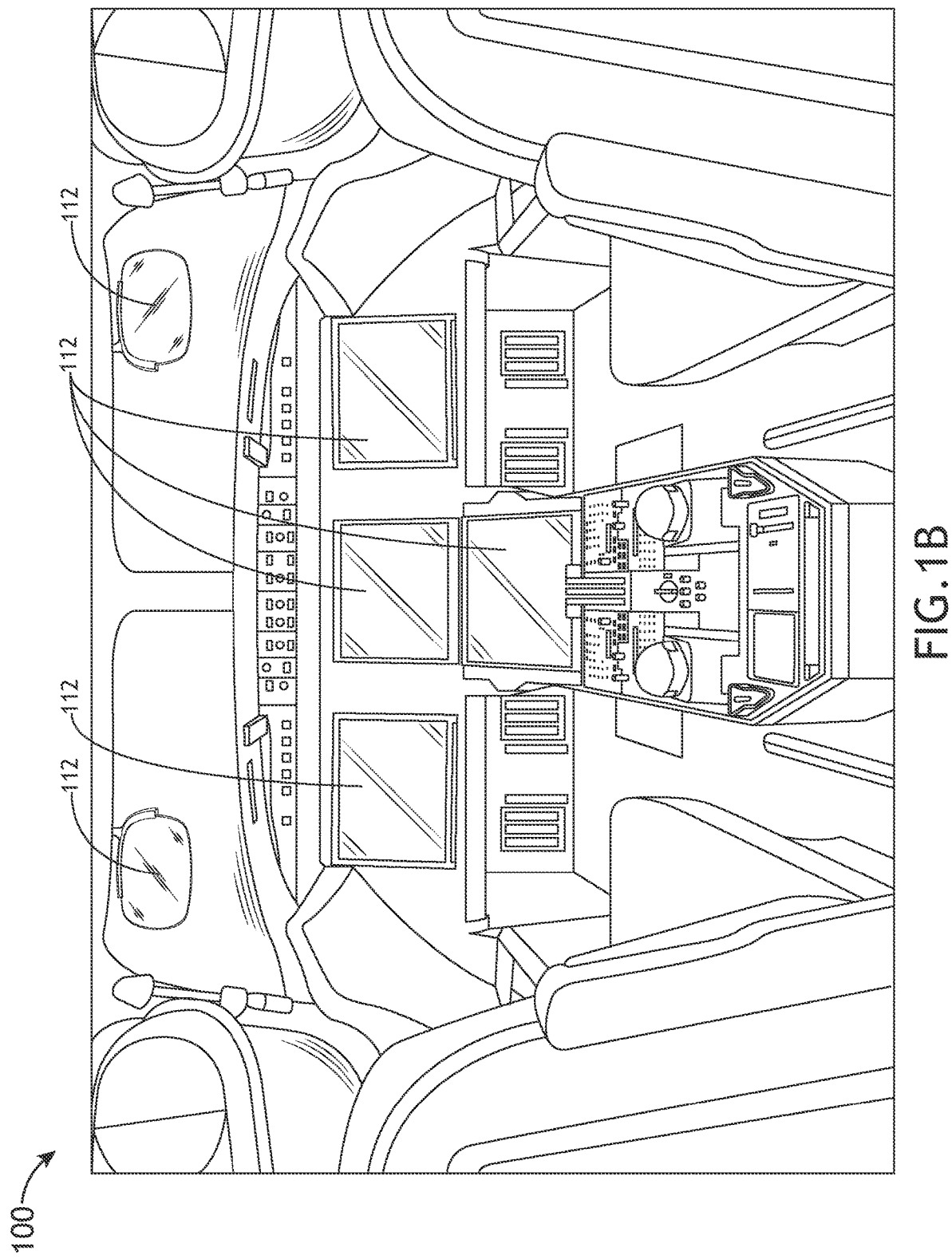
FIG. 1B illustrates an aircraft including the system for machine code subroutine creation and execution with indeterminate addresses, in accordance with one or more embodiments of the present disclosure.

FIG. 1A illustrates a simplified block diagram of an aircraft including the system for machine code subroutine creation and execution with indeterminate addresses, in accordance with one or more embodiments of the present disclosure. FIG. 1B illustrates an aircraft including the system for machine code subroutine creation and execution with indeterminate addresses, in accordance with one or more embodiments of the present disclosure.

Referring now to FIG. 1A, the aircraft 100 may include an aircraft controller 102 (e.g., on-board aircraft controller/run-time aircraft controller). The aircraft controller 102 may include one or more processors 104, memory 106 configured to store one or more program instructions 108, and/or one or more communication interfaces 110.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display two-dimensional images and/or three-dimensional images. For example, the one or more display devices 112 may be configured to display one or more avionics charts (or aeronautical charts). Referring now to FIG. 1B, the avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs), one or more adaptive flight displays (AFDs) 112, one or more primary flight displays (PFDs) 112, or the like.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more GPS satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124.

The one or more offboard controllers 124 may include one or more processors 126, memory 128 configured to store one or more programs instructions 130, and/or one or more communication interfaces 136.

The offboard controller 124 may be configured to receive chart data from one or more chart providers. For example, the offboard controller 124 may be configured to receive chart data from one or more third party chart providers.

It is noted that the offboard controller 124 may be configured to receive any type of avionics chart data from any chart provider. For example, the offboard controller 124 may be configured to receive chart data for one or more terminal avionics charts. By way of another example, the offboard controller 124 may be configured to receive chart data for one or more enroute avionics charts. By way of another example, the offboard controller 124 may be configured to receive one or more hybrid avionics charts (e.g., VFR landmarks, terrain data, obstacle data, or the like).

The offboard controller 124 may be configured to convert the received chart data into one or more sets of one or more hardware directives 132 and one or more sorted keys 134. For example, the one or more program instructions 130 of the offboard controller 124 may be configured to cause the one or more processors 126 to convert the received chart data into one or more sets of one or more hardware directives 132 and store the converted hardware directives in memory 128. By way of another example, the one or more program instructions 130 of the offboard controller 124 may be configured to cause the one or more processors 126 to convert the received chart data into one or more sorted keys 134 (e.g., subroutines 220) and store the sorted keys 134 (e.g., subroutines 220) in memory 128. In this regard, the converted hardware directives and the sorted keys (e.g., subroutines 220) may be configured to speed up data access during run-time.

The one or more sets of hardware directives may include at least a first set of one or more hardware directives (e.g., offsets 210) needing address modification. For example, the first set of one or more hardware directives (e.g., offsets 210) may include one or more relative offsets 210, where the one or more relative offsets 210 may be generated remotely without knowledge of one or more base addresses. As previously discussed herein, it is noted that the base address is not known offline (e.g., prior to run-time) and often varies depending on the hardware of the display system.

The one or more sets of hardware directives may include at least an additional set of one or more hardware directives not needing address modification (e.g., hardware directives 214).

The one or more generated hardware directives may include any type of hardware directive suitable for displaying avionics chart images on display hardware (e.g., display devices 112) including, but not limited to, move, draw, set color, call subroutine, rotate, translate, scale, return, and the like.

The one or more sorted keys (e.g., subroutines) may include any type of sorted key (e.g., subroutine) suitable for avionics charts. For example, the one or more sorted keys (e.g., subroutines) may include a subroutine configured to draw a symbol (e.g., an arrowhead). In this regard, during run-time, the aircraft controller 102 may execute (e.g., "call") the subroutine each time a symbol (e.g., an arrowhead) is encountered, rather than creating the symbol (e.g., the arrowhead) multiples times. By way of another example, the one or more sorted keys (e.g., subroutines) may include a subroutine configured to draw an alphanumeric character. In this regard, during run-time, the aircraft controller 102 may execute (e.g., "call") the subroutine each time an alphanumeric is encountered, rather than drawing multiple lines each time an alphanumeric is encountered. For instance, the subroutine may be configured to draw an "A" and during run-time, the aircraft controller 102 may execute (e.g., "call") the subroutine each time an "A" is encountered, rather than drawing multiple lines each time an "A" is encountered. By way of another example, the one or more sorted keys (e.g., subroutines) may include a graphics control directive subroutine. In this regard, during run-time, the aircraft controller 102 may execute (e.g., "call") the subroutine each time a graphics control directive (e.g., dash pattern, color, or the like) is encountered, rather than executing the graphics control directive each time the directive is encountered. For instance, the subroutine may be configured to draw an "dash pattern" and during run-time, the aircraft controller 102 may execute (e.g., "call") the subroutine each time an "dash pattern" is encountered, rather than drawing multiple lines each time an "dash pattern" is encountered. By way of another example, the one or more sorted keys (e.g., subroutines) may include a subroutine configured to draw a repeating pattern (e.g., special use airspaces (SUAs), air route traffic control center (ARTCC) regions, air defense identification zones (IADIZs), or the like). In this regard, during run-time, the aircraft controller 102 may execute (e.g., "call") the subroutine each time the repeating pattern is encountered, rather than drawing the repeating pattern each time the repeating pattern is encountered.

It is noted that the aforementioned examples are provided merely for illustrative purposes and shall not be construed as limiting the scope of the present disclosure.

Figure 2:
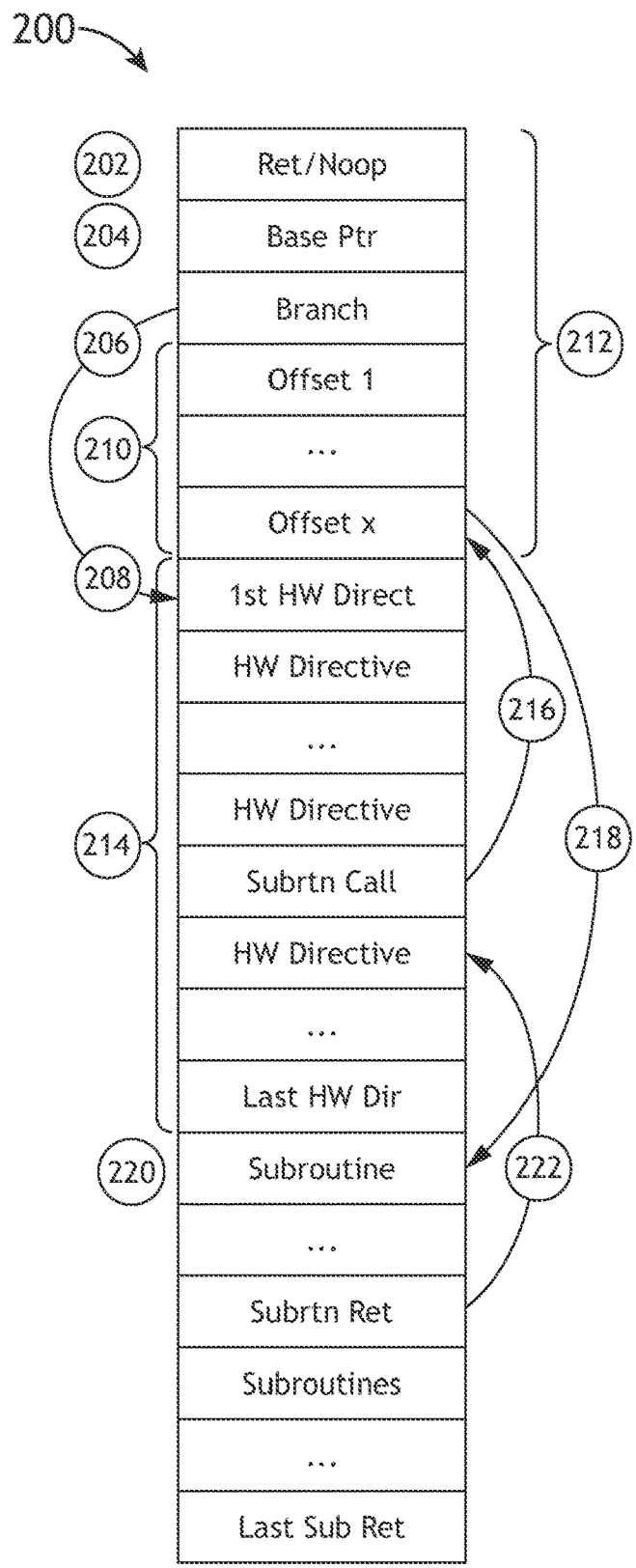
FIG. 2 illustrates a simplified block diagram of a display list of the system, in accordance with one or more embodiments of the present disclosure.

Referring to FIG. 2, the offboard controller 124 may be configured to generate a display list 200 including the generated set of one or more hardware directives 210, 212, the one or more subroutines 220, and a set of one or more rules.

The set of one or more rules may include any set of rules. For example, the set of one or more rules may include a first rule 202 including a no operation command. In one instance, during run-time, the aircraft controller 102 may be configured to set the first rule 202 as return (e.g., "Ret") when no image is loaded. In another instance, during run-time, the aircraft controller 102 may be configured to set the first rule 202 as no operation (e.g., "Noop") when an image is loaded.

By way of another example, the set of one or more rules may include a second rule 204 configured to set the base pointer opcode. For instance, during run-time, the aircraft controller 102 may be configured to place the base address into this opcode when the absolute address is known and the chart is loaded.

By way of another example, the set of one or more rules may include a third rule 206 configured to "branch" to a portion of the display list 200. For example, the "branch" may be configured to cause the aircraft controller 102 to execute the display list 200 in a predetermined order (e.g., skip over data that needs to be updated and move on to the actual image itself) and provide the display list organization structure 212 size (e.g., to tell the controller 102 how much data needs to be updated with base pointer/absolute address information during run-time). It is noted that this allows the processors 104 to modify addresses in a highly limited area of the display list 200.

Referring to FIG. 2, the display list 200 may include a display list organization structure 212 including at least the first rule 202, the second rule 204, the third rule 206, and the one or more relative offsets 210 (e.g., second set of hardware directives). Further, although not shown, the display list organization structure 212 may include one or more Boolean logic instructions.

The one or more relative offsets 210 may be arranged at the beginning of the display list 200. In this regard, all references which need updated may be placed at the beginning of the display list 200, such that the time required to update the hardware directives with the current base address is reduced.

The offboard controller 124 may be configured to provide the generated display list 200 to the on-board aircraft controller 102 to perform during run-time. For example, the communication interface 110 may be configured to receive the generated display list 200 and store the generated display list 200 in memory 106. For instance, during run-time, the aircraft controller 102 may be configured to access the generated display list 200 in memory 106 and perform during run-time.

The communication interface 134 of the offboard controller 124 may be communicatively coupled to the communication interface 110 of the on-board aircraft controller 102. For example, the communication interface 134 may be configured to provide the generated display list 200 (stored in memory 128) to the communication interface 110 via a wireless and/or wireline connection.

During run-time, the on-board aircraft controller 102 may be configured to insert a no operation (e.g., "No op") position if an image is loaded.

During run-time, the on-board aircraft controller 102 may be configured to insert a return (e.g., "Ret") position if no image is loaded. For example, if a return position is inserted, then the image will need to be called and nothing is displayed.

During run-time, the on-board aircraft controller 102 may be configured to set the base pointer. The base pointer may be configured to indicate to the hardware that any relatively addressed hardware directives (e.g., offsets) may be addressed from the base pointer location. For example, when the generated display list 200 is loaded, the one or more program instructions 108 of the aircraft controller may be configured to place the base address into the base pointer opcode 206 (as shown in FIG. 2).

For instance, as discussed previously herein, offsets may be generated by the offboard controller 124 as relative offsets to a specific location. During run-time, only these addresses need to be updated by adding the base address (which is only known at run-time) to the relative addresses provided by the offboard (or offline) controller 124.

During run-time, the on-board aircraft controller 102 may be configured to perform the second set of one or more hardware directives (e.g., hardware directives that do not require updating during run-time). For example, during run-time, the on-board aircraft controller 102 may be configured to "branch" to the second set of one or more hardware directives, while skipping the first set of one or more hardware directives (e.g., offsets) in the display list organization structure.

The second set of one or more hardware directives may include the chart image to be rendered. Further, the second set of one or more hardware directives may include calls to subroutines (accessed by calls through addresses stored in the display list organization structure).

During run-time, when a subroutine is encountered, the on-board aircraft controller 102 may be configured to make an indirect call. It is noted that to execute the call, an absolute address must reside at the indirect address given. In this regard, the offboard controller 124 may be configured to store the relative (or negative) address of the offset, pointing to the display list organization structure.

During run-time, the on-board aircraft controller 102 may be configured to update the addresses in the display list organization structure after the base address is determined (as discussed previously herein). For example, the one or more processors 104, after determining the base address, may be configured to updates the addresses in the display list organization structure. For instance, the one or more program instructions 108 of the aircraft controller 102 may be configured to cause the one or more processors 104 to update one or more absolute addresses of the first set of one or more hardware directives during run-time. It is noted that by adding the base address to the offboard controller provided offsets, an absolute address is yielded.

During run-time, the on-board aircraft controller 102 may be configured to execute the subroutine from the absolute address stored in the display list organization structure. The subroutine return 222 may be configured to pass control back to the next location following the original call the second set of hardware directives 214 of the display list 200.

The aircraft controller 102 and/or the one or more offboard controllers 124 may be coupled (e.g., physically, electrically, and/or communicatively) to one or more satellites 138. For example, the aircraft controller 102 and/or the one or more offboard controllers 124 may be coupled (e.g., physically, electrically, and/or communicatively) to one another via the one or more satellites 138. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 138 may be considered components of a system 140, for purposes of the present disclosure. The system may be generally discussed in concurrently filed U.S. Patent Publication No. 2023/0154338, published on May 18, 2023 entitled TOOL TO FACILITATE CUSTOMER GENERATED CHART DATABASES FOR USE WITH A CERTIFIED AVIONICS SYSTEM, which is incorporated herein by reference in the entirety.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 140). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, touchpad, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 3:
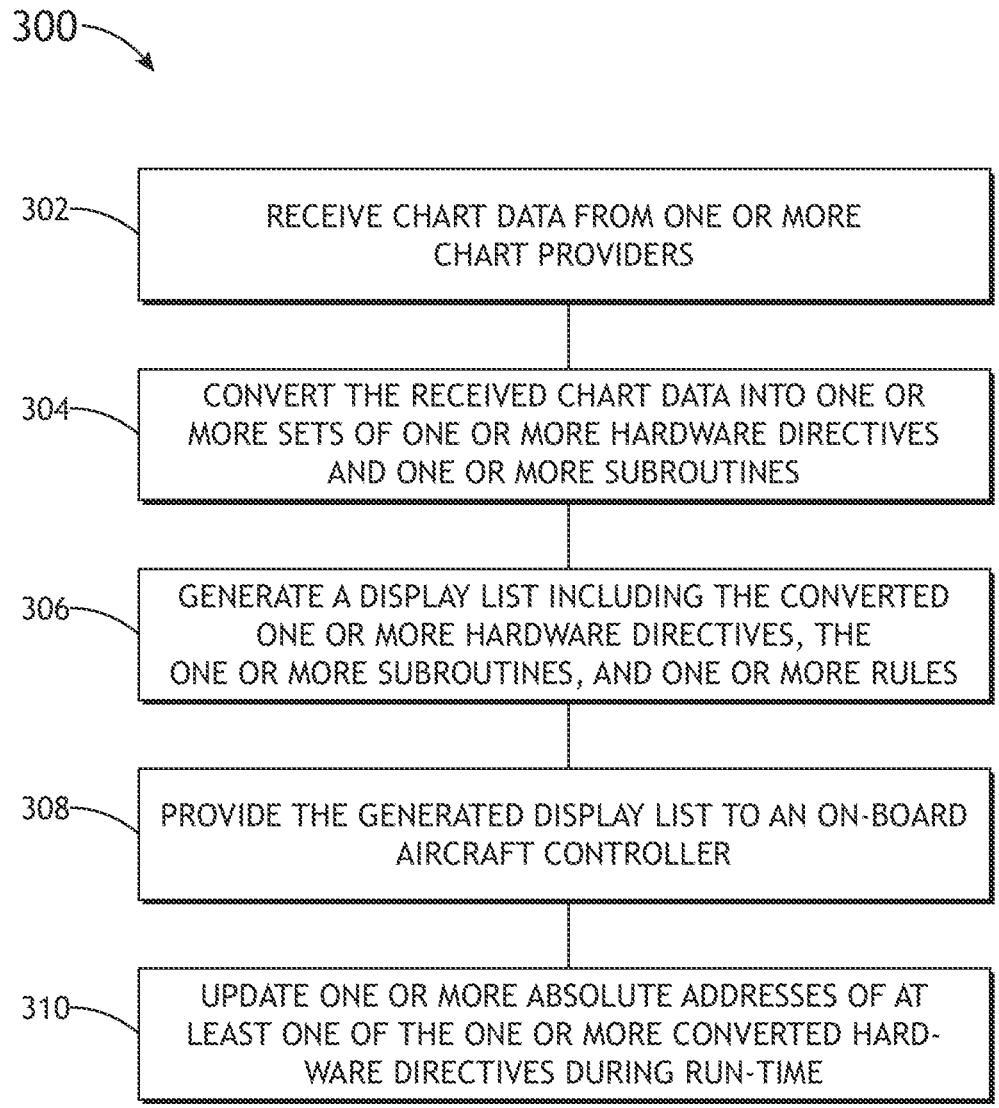
FIG. 3 illustrates a flowchart depicting a method or process for machine code subroutine creation and execution with indeterminate addresses, in accordance with one or more embodiments of the present disclosure.

FIG. 3 illustrates a flowchart depicting a method or process for machine code subroutine creation and execution with indeterminate addresses, in accordance with one or more embodiments of the disclosure.

In a step 302, chart data may be received from a third-party chart provider. For example, the offboard controller 124 may be configured to receive chart data from a third-party chart provider. In one instance, the offboard controller 124 may be configured to receive enroute chart data from a third-party enroute chart provider. In another instance, the offboard controller 124 may be configured to receive terminal chart data from a third-party terminal chart provider.

It is noted that the offboard controller 124 may be configured to receive any type of chart from any suitable third-party chart provider.

In a step 304, the received chart data may be converted into one or more sets of one or more hardware directives 132 and one or more sorted keys 134 (e.g., subroutines). For example, the offboard controller 124 may be configured to convert the received chart data into one or more sets of one or more hardware directives 132 and one or more sorted keys 134. In one instance, the one or more program instructions 130 of the offboard controller 124 may be configured to cause the one or more processors 126 to convert the received chart data into one or more sets of one or more hardware directives 132 and store the converted hardware directives in memory 128. In another instance, the one or more program instructions 130 of the offboard controller 124 may be configured to cause the one or more processors 126 to convert the received chart data into one or more sorted keys 134 (e.g., subroutines 220) and store the sorted keys 134 (e.g., subroutines 220) in memory 128. In this regard, the converted hardware directives and the sorted keys (e.g., subroutines 220) may be configured to speed up data access during run-time.

In a step 306, a display list 200 may be generated. For example, the offboard controller 124 may be configured to generate a display list 200 including the generated set of one or more hardware directives 210, 212, the one or more subroutines 220, and a set of one or more rules. Referring to FIG. 2, the display list 200 may include a display list organization structure 212 including at least the first rule 202, the second rule 204, the third rule 206, and the one or more relative offsets 210 (e.g., second set of hardware directives). Further, although not shown, the display list organization structure 212 may include one or more Boolean logic instructions.

In a step 308, the generated display list 200 may be provided to the on-board controller 102 to perform during run-time. For example, the offboard controller 124 may be configured to provide the generated display list 200 to the on-board controller 102 to perform during run-time. For instance, the communication interface 110 may be configured to receive the generated display list 200 and store the generated display list 200 in memory 106. In this regard, during run-time, the aircraft controller 102 may be configured to access the generated display list 200 in memory 106 and perform during run-time.

In a step 310, one or more absolute addresses of the one or more relative offsets may be updated. For example, the aircraft controller 102 may be configured to update the one or more absolute addresses of the one or more relative offsets of the first set of one or more hardware directives during run-time.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the present disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system, the system comprising:
   one or more offboard aircraft controllers including one or more processors configured to execute a set of program instructions stored in a memory, the set of program instructions configured to cause the one or more processors to:
      receive chart data from one or more chart providers;
      convert the received chart data into one or more sets of one or more hardware directives and one or more subroutines, the one or more sets of one or more hardware directives including at least a first set of one or more hardware directives and a second set of one or more hardware directives, the first set of one or more hardware directives including one or more relative offsets needing address modification, the second set of one or more hardware directives not needing address modification;
      generate a display list including the set of one or more hardware directives and one or more rules, the one or more relative offsets needing address modification arranged at a beginning position of the generated display list; and
      provide the generated display list to one or more on-board aircraft controllers configured to update one or more absolute addresses of the one or more relative offsets of the first set of one or more hardware directives during run-time.

2. The system of claim 1, the one or more on-board aircraft controllers including one or more processors configured to execute a set of program instructions stored in a memory, the set of program instructions configured to cause the one or more processors to:
      update the one or more absolute addresses of the one or more relative offsets of the first set of one or more hardware directives during run-time;
      perform at least one hardware directive of the set of one or more hardware directives;
      execute the one or more subroutines; and
      execute the one or more rules.

3. The system of claim 1, wherein the one or more subroutines includes at least one subroutine configured to draw a symbol.

4. The system of claim 1, wherein the one or more subroutines includes at least one subroutine configured to draw one or more alphanumeric characters.

5. The system of claim 1, wherein the second set of one or more hardware directives includes a chart image to be rendered based on the received chart data from the one or more chart providers.

6. The system of claim 1, wherein the second set of one or more hardware directives includes one or more calls to the one or more subroutines.

7. The system of claim 1, wherein the one or more rules include at least one no operation command rule.

8. The system of claim 1, wherein the one or more rules include at least one set base point opcode rule configured to cause at least one on-board aircraft controller of the one or more on-board aircraft controllers to set a base address for the one or more relative offsets during run-time.

9. The system of claim 1, wherein the one or more rules include at least one branching rule configured to cause at least one on-board aircraft controller of the one or more on-board aircraft controllers to execute the display list in a predetermined order.

10. A method, the method comprising:
    receiving chart data from one or more chart providers;
    converting the received chart data into one or more sets of one or more hardware directives and one or more subroutines, the one or more sets of one or more hardware directives including at least a first set of one or more hardware directives and a second set of one or more hardware directives, the first set of one or more hardware directives including one or more relative offsets needing address modification, the second set of one or more hardware directives not needing address modification;
    generating a display list including the set of one or more hardware directives and one or more rules, the one or more relative offsets needing address modification arranged at a beginning position in the generated display list;
    providing the generated display list to one or more on-board aircraft controllers; and
    updating, via the one or more on-board aircraft controllers, one or more absolute addresses of the one or more relative offsets of the first set of one or more hardware directives during run-time.

11. The method of claim 10, wherein the second set of one or more hardware directives includes a chart image to be rendered based on the received chart data from the one or more chart providers.

12. The method of claim 10, wherein the second set of one or more hardware directives includes one or more calls to the one or more subroutines.

13. The method of claim 10, wherein the one or more rules include at least one no operation command rule.

14. The method of claim 10, wherein the one or more rules include at least one set base point opcode rule configured to cause at least one on-board aircraft controller of the one or more on-board aircraft controllers to set a base address for the one or more relative offsets during run-time.

15. The method of claim 10, wherein the one or more rules include at least one branching rule configured to cause at least one on-board aircraft controller of the one or more on-board aircraft controllers to execute the display list in a predetermined order.

\* \* \* \* \*